United States Patent [19]

Bowers et al.

[11] 4,223,390

[45] Sep. 16, 1980

[54] SYSTEM AND METHOD FOR ATTACHING MAGNETIC STORAGE DEVICES HAVING DISSIMILAR TRACK CAPACITIES AND RECORDING FORMATS

[75] Inventors: Earl Q. Bowers; David L. Nelson, both of San Jose, Calif.

[73] Assignee: International Business Machines Corporation, Armonk, N.Y.

[21] Appl. No.: 653,684

[22] Filed: Feb. 2, 1976

Related U.S. Application Data

[63] Continuation-in-part of Ser. No. 589,288, Jun. 23, 1975, abandoned.

[51] Int. Cl.$^2$ .................................... G06F 13/00
[52] U.S. Cl. ................................................ 364/900
[58] Field of Search .................. 340/172.5; 445/1; 444/1; 360/39, 47, 48, 49; 364/200 MS File, 900 MS File

[56] References Cited

U.S. PATENT DOCUMENTS

| | | | |
|---|---|---|---|
| 3,238,506 | 3/1966 | Jung et al. | 340/172.5 |
| 3,299,410 | 1/1967 | Evans | 364/900 |
| 3,299,411 | 1/1967 | Capozzi et al. | 364/900 |
| 3,521,240 | 7/1970 | Bahrs et al. | 340/172.5 |
| 3,638,195 | 1/1972 | Brender et al. | 340/172.5 |
| 3,647,348 | 3/1972 | Smith et al. | 340/172.5 |
| 3,699,528 | 10/1972 | Carlson et al. | 340/172.5 |
| 3,792,442 | 2/1974 | Koeijmans | 340/172.5 |
| 3,840,864 | 10/1974 | Chang et al. | 340/172.5 |

OTHER PUBLICATIONS

N. K. Ouchi, *System For Blocking Variable Length Records*, IBM TDB vol. 16, No. 4, 9/73, pp. 1239-1240.
"Single Track Seek Overlap", R. W. King and J. D. Ovrebo, IBM Technical Disclosure Bulletin, vol. 17/No. 7, 1974.

*Primary Examiner*—Harvey E. S------

*Attorney, Agent, or Firm*—Richard E. Cummins

[57] ABSTRACT

A system and method attach a second magnetic storage device to a storage subsystem which includes one or more first magnetic storage devices. The track capacity of the first device, i.e., the maximum number of bytes per track, is different from the track capacity of the second device. The information stored on the first device is formatted with a first recording format wherein the start of each individual record measured in the number of bytes from the start of the track varies with either the number of records preceding it, or the length of each preceding record, e.g., a count-key-and-data format. The method involves the steps of generating a "bytes used" number in the second device which reflects, at predetermined times, the number of bytes between the start of a track and the start of each record if the record had been written on the first device in the first format; recording the "bytes used" number in a "bytes used" field of each record each time each record is recorded on the second device; and generating a virtual index signal when the "bytes used" number corresponds to the track capacity of the first device. The system comprises a counter in the second device, a clock signal for stepping the counter at a rate which corresponds to the data rate of the second device, and a plurality of circuits for controlling the operation of the counter so that the contents thereof, at the time each record is to be written, reflects the number of bytes between the start of the track and the start of each record if the record had been written on the first device in the first format. Circuitry is also provided for transferring the contents of a counter to the recording circuits of the device at preselected times. The system also includes a signal generator, which is connected to the counter, and, at a time when the contents of the counter corresponds to the track capacity of the first device, issues a virtual index signal.

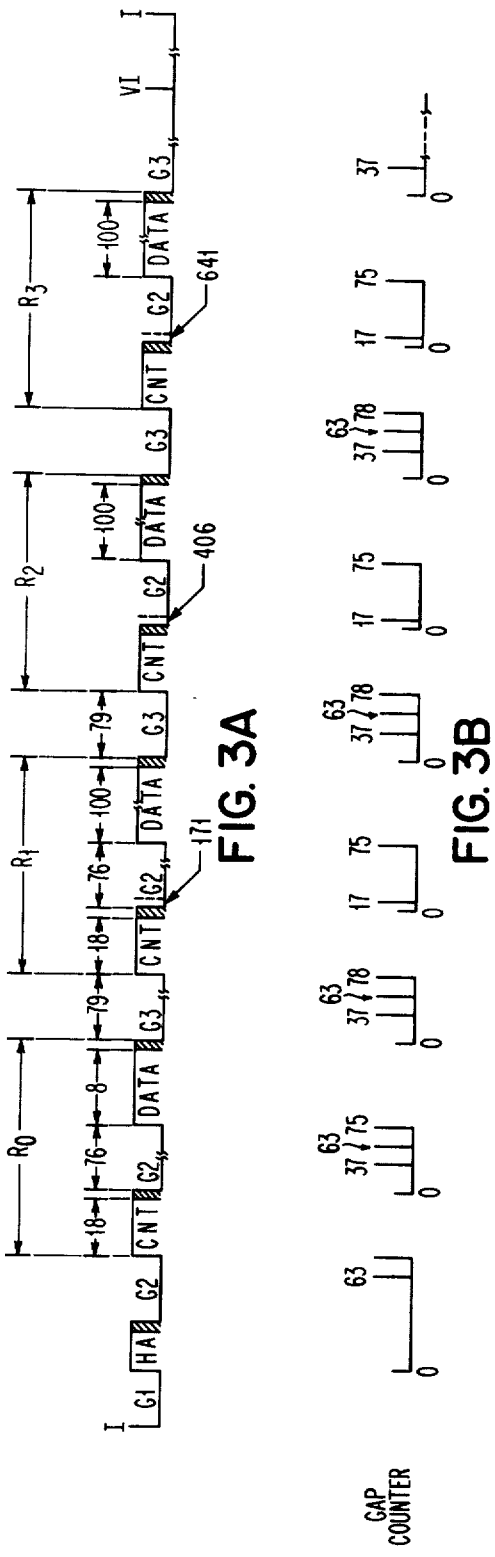
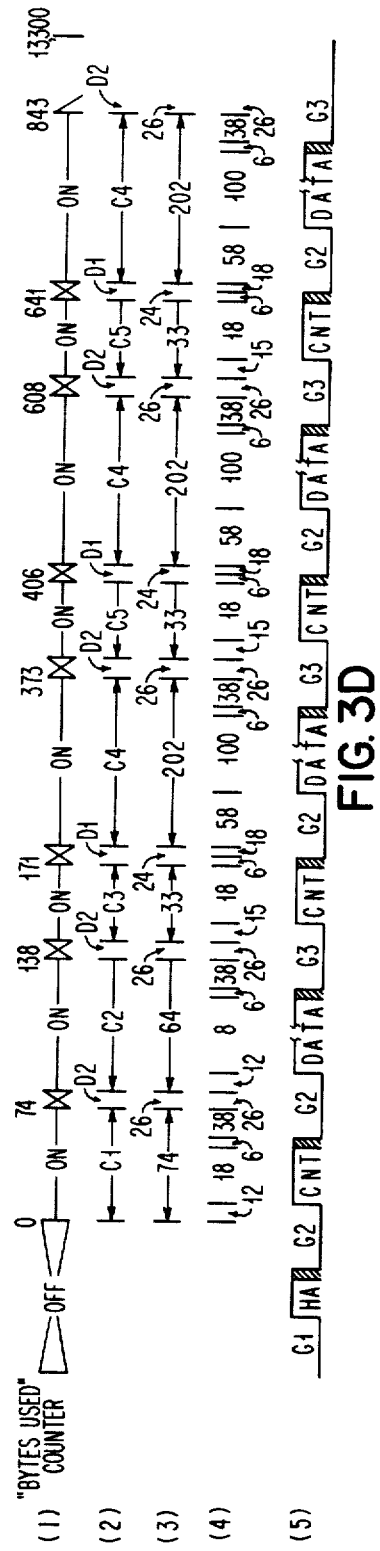

SYSTEM AND METHOD FOR ATTACHING MAGNETIC STORAGE DEVICES HAVING DISSIMILAR TRACK CAPACITIES AND RECORDING FORMATS

RELATED APPLICATIONS

This is a continuation-in-part of application Ser. No. 589,288, filed on June 23, 1975, now abandoned, and assigned to the assignee of the present invention.

BACKGROUND OF THE INVENTION

The most widely used direct access storage device for storing large amounts of information in a data processing system is a magnetic disk file. A disk file generally comprises a disk drive and a removable pack or cartridge such as the IBM types 2314, 3330, 3340 disk drives and IBM types 2316 and 3336 disk packs and 3348 disk cartridges. In some disk files the disks are not removable by the user. The number of disks employed in a disk pack or file is fixed for a specific model and is generally a function of the total amount of storage desired in the system.

The recording surface of the disk is normally composed of a large number of concentric circular tracks. The number of tracks on each disk for a specific disk drive is usually the same and is generally a function of the magnetic transducer positioning system of the disk drive. The number of tracks or track density may and does vary between types of disk drives. Likewise, the density at which information is recorded measured in bits per inch along the track varies between different types of disk drives and is usually a function of the magnetic surface, recording head and other components of the recording system of the drive. Track capacity is a function of recording density measured in bits per inch and the physical length of the track. Track capacity is generally fixed for a specific disk drive, but may and does differ among various types of disk drives. Lastly, the rate at which the disk rotates may differ between the various types of disk drives. The data rate of a file is measured in bytes per second and is a measure of how fast data can be recorded and read from the file. The raw data rate is a function of the linear recording density and the rate at which the disk is revolving, each of which is fixed for a specific disk drive; but different types of disk drives may and do have different raw data rates.

In most data processing systems, information is handled in the form of individual addressable records. Generally, the track capacity of any disk drive, that is, the number of bytes of information that the track can store, is many orders of magnitude greater than the number of bytes of an individual record. As a result, data tracks can and do store a number of different records. From a data processing system standpoint, only one record is processed at a time by the system so various arrangements have been used which allow individual records on a track to be identified.

In one such prior art arrangement, the length of all records are fixed generally at a sub-multiple of the track capacity so that the address of the record can be directly converted to a particular physical sector of the circular track. If, for example, the track capacity was 10,000 bytes, each of the records would be fixed at 1,000 bytes, and means would be provided to identify the beginning of each of the ten different sectors of the disk. In some of the systems, the format of the individual record would permit an address field designating the device address, the track address and the sector address of the particular record.

The above arrangement is generally employed where information to be handled by the system or to be stored results in records of the same length. Where the length of the records varies substantially the storage efficiency of such an arrangement is decreased since the track format must allow for a maximum length record in any sector or record position.

In another prior art arrangement, the track format allowed for multiple records on the same track to vary in length relative to each other, but the physical position of each record was fixed. This arrangement, in effect, again divides the track into sectors, but allows the size of any one sector to be independent of the other sectors. This arrangement has advantages where the record lengths are known in advance and the possibility of changing the record length is minimal.

The third arrangement suggested by the prior art which is probably the most widely used in present day data processing systems is referred to as Count-Key-Data (CKD). The wide use of the Count-Key-Data format is undoubtedly due to its flexibility which allows records to be of variable length. Briefly, in this format, the basic record format involves a count field, an optional and variable length key field and a variable length data field. The count field and the key field are integral parts of the record as it is processed in the data processing system. The count field is fixed in length and specifies the record number on the track and the respective lengths of the key and data fields. The key field, if used, is variable length and may be used to rapidly identify particular records which have been stored in accordance with some preestablished classification scheme based on the key fields. The last field of the record is the data field and can be of variable length.

In order to gain the inherent flexibility of a Count-Key-Data record format, it is necessary when recording the record on the track to insert prior to a count field a unique identifier, referred to as the address mark. Since it is also desirable to be able to modify either the following key field or the data field, or both, on the same revolution, a finite time is required between the fields to compare the record identifier read from the count field against some search argument and then switch the appropriate circuits from a reading mode to a writing mode. The Count-Key-Data format when recorded on the track therefore provides inter-field gaps on the track and also inter-record gaps between the end of the data field of one record and the beginning of the count field on the next record. The physical length measured in inches of the particular gaps for any given model of the disk drive is a function of the decision time necessary to switch from one operation to another and will therefore be proportional to the rotational speed of the disks. The length of the gaps measured in number of bytes, of course, will be dependent upon the linear recording density of the particular drive in addition to the rotational speed of the disk and will therefore be related to the raw data rate of the drive.

It will be apparent from the above that the starting point of a record measured in terms of the number of bytes from the beginning of the track in a CKD format is dependent upon several factors such as the length of the data fields preceding it, the type of preceding records and the number of preceding records since this affects the number of gaps. It should also be apparent that the number of records capable of being recorded on any track will be affected by the same factors. Specified track capacity can be and usually is defined by a formula relating the number of records, the length of key and data fields, and a number of bytes, which may be less than the maximum capacity, to account for timing tolerances that occur under worse case conditions.

A data processing system is generally programmed to reflect the total amount of storage available to the system, each storage device being defined in terms of the number of addressable tracks and the storage capacity of each track. The system may assign records to storage tracks and does the necessary accounting to insure that the number of records assigned to a given track is within the capacity of the track. Alternatively, the system may determine the number of bytes remaining on the track after the last record by trial and error and then fill the track close to actual capacity by selecting an appropriate sized record for that track. As additional storage devices of the same type are added to the system, the data processing system merely has to assign new addresses.

However, when new storage devices are developed in which the track capacity measured in the number of bytes is increased, a problem arises in attempting to attach these devices into a system which currently employs disk files having lower track capacities and a particular Count-Key-Data format. The problem has been solved in the past by reprogramming the data processing system to take into account all the characteristics of the new device. This involves considerable reprogramming effort and imposes additional housekeeping functions on the overall system to insure that a full track of records that is written on one device can be appropriately handled on the other device.

SUMMARY OF THE INVENTION

The present invention provides a method and apparatus which eliminates the need to reprogram the system and makes those format characteristics of the added device which are different from the installed device transparent to the system.

It is an object of the present invention to provide in each record on a track of a disk file a number which is related to the number of bytes that would have occurred between the start of the track and the beginning of the record if all preceding records on the track had been recorded on a track of a different storage device.

Another object of the present invention is to provide an arrangement for a disk file which allows it to replace another file in a data processing system without altering that portion of the data processing program which is dependent on the specified byte capacity per track of the replaced file even though the substituted file has a greater specified capacity.

A further object of the invention is to provide a virtual index signal for a disk file in which the byte capacity per track is greater than the byte capacity per track of another file. In this regard, the virtual index signal occurs at a point in time in a sequence of records which corresponds to a point in time when the real index signal would occur if the sequence had been recorded on the lower capacity track.

The method involves the steps of formatting a track in which each of the records written on the second device includes a number field, generating a number each time one of the records is written on the second device, the number corresponding to the number of bytes that would have been present between the start of the track index and the start of the record if the record had been written on the first device in the first format. The method further includes the steps of recording that generated number in the number field of the record each time the record on the second device is recorded, and generating a virtual index signal when a byte position is reached on the second device corresponding to the real index signal which is generated at the physical end of the first device track.

The apparatus comprises the means for formatting records on each track of the second device, a counter in the second device, means for stepping the counter at a rate which corresponds to the data rate of the second device, and a plurality of circuits for controlling the operation of the counter so that the contents thereof at the time each record is to be written reflects the number of bytes that would be present between the start of the track (index) and the start of the record if the record had been written on the first device in the first format and means for transferring the contents of the counter to the recording media under control of the formatting means.

The apparatus further comprises means for generating a virtual index signal at a time when the contents of the counter corresponds to the track capacity of the first device.

BRIEF DESCRIPTION OF THE DRAWINGS

FIGS. 3A through 3D illustrate how the information recorded in FIG. 1 would be recorded on an IBM type 3350 disk file in accordance with the present invention.

DESCRIPTION OF THE PREFERRED EMBODIMENT

Figure 1:
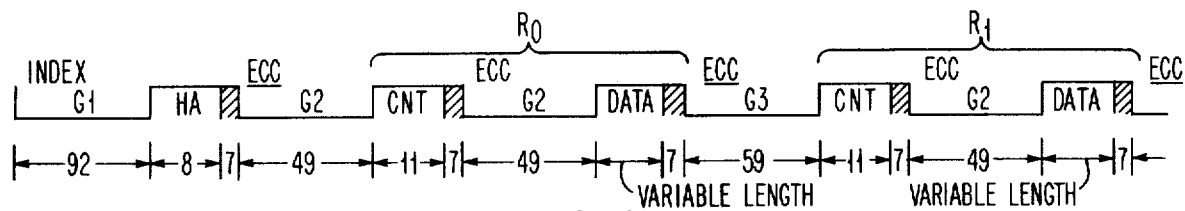
FIG. 1 shows a typical track format of an IBM type 3330 disk file.
Figure 2:
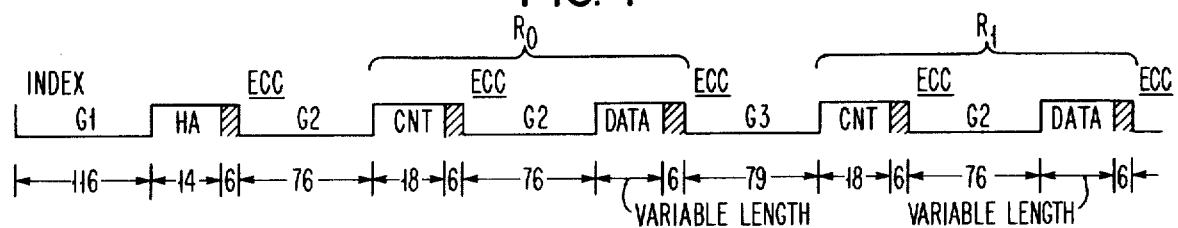
FIG. 2 shows a typical track format of an IBM type 3350 disk file when operating in a native mode.

The problem presented by the addition of a new storage device to a system where the attached storage devices have a smaller byte capacity per track and different CKD format requirements can best be understood by reference to FIGS. 1 and 2. In the following description, the terms 3330 and 3350 refer to IBM type 3330 and IBM type 3350 magnetic disk files. It is assumed for purposes of explanation that the physical length measured in inches of both tracks is the same, but that the linear recording density of the 3330 track is less than the linear recording density of the 3350 track, such that the 3350 has a greater track capacity measured in bytes. It is also assumed that the disks would rotate at the same speed so that the raw data rate of the 3350 is higher than the raw data rate of the 3330. FIG. 1 illustrates the CKD track format for a 3330 type drive and the number of bytes assigned for the various fields and gaps. FIG. 2 illustrates the CKD track format for the 3350 type drive and the number of bytes assigned for the various fields and gaps.

The following table is a comparison of the number of bytes used in each of the two formats.

TABLE I

| Index | 3330 Start of Field | 3330 Field Length | 3350 Start of Field | 3350 Field Length | Format Difference + | Format Difference − | | |
|---|---|---|---|---|---|---|---|---|
| G1 | 0 | 92 | 0 | 116 | 24 | | | |
| HA | 92 | 8 | 116 | 14 | 6 | | | |
| ECC | 100 | 7 | 130 | 6 | | 1 | | |
| G2 | 107 | 49 | 136 | 76 | 27 | | | |
| R0 CNT | 156 | 11 | 212 | 18 | 7 | | | |
| ECC | 167 | 7 | 230 | 6 | | 1 | | |
| G2 | 174 | 49 | 236 | 76 | 27 | | | |
| DATA | 223 | 8* | 312 | 8* | — | — | | |
| ECC | 231 | 7 | 320 | 6 | | 1 | | |
| G3 | 238 | 59 | 326 | 79 | 20 | | | |
| | | 297 | | 405 | 111 | − 3 | = 108 | |
| R1 CNT | 297 | 11 | 405 | 18 | 7 | | | |
| ECC | 308 | 7 | 423 | 6 | | 1 | | |
| G2 | 315 | 49 | 429 | 76 | 27 | | | |
| DATA | 364 | 100* | 505 | 100* | — | | | |
| ECC | 464 | 7 | 605 | 6 | | 1 | | |
| G3 | 471 | 59 | 611 | 79 | 20 | | | |
| | | 233 | | 285 | 54 | − 2 | = 52 | |

From Table I it will be seen that record R1 starts at a different byte location on the 3350 than on the 3330 and that the difference in byte locations would be constant if the R0 data fields were the same.

As shown, R1 begins at byte position 405 on the 3350 and at byte position 297 on the 3330, assuming that the count is started at the end of index. The net difference in bytes between the two formats up to the beginning of R1 is therefore 108 bytes.

Record R1 including the following G3 gap uses 234 byte positions on the 3330 and 285 bytes on the 3350 resulting in a net difference of 52 byte positions.

A similar fixed relationship exists for records R2-Rn on the two tracks as shown by the following table. A G3 type gap separates two successive records and, while the byte lengths of the G3 gaps in the two formats differ, the difference is a constant. Table II is a continuation of the previous table and correlates the amount of track used in each format for the records R2-Rn.

TABLE II

| Index | 3330 Start of Field | 3330 Field Length | 3350 Start of Field | 3350 Field Length | Format Difference + | Format Difference − | | |
|---|---|---|---|---|---|---|---|---|
| R2 CNT | 530 | 11 | 690 | 18 | 7 | | | |
| ECC | 541 | 7 | 708 | 6 | | 1 | | |
| G2 | 548 | 49 | 714 | 76 | 27 | | | |
| DATA | 597 | 200* | 790 | 200* | — | — | | |
| ECC | 797 | 7 | 990 | 6 | | 1 | | |
| G3 | 804 | 59 | 996 | 79 | 20 | | | |
| | | 333 | | 385 | 54 | − 2 | = 52 | |
| Rn CNT | 863 | 11 | 1075 | 18 | 7 | | | |
| ECC | 874 | 7 | 1093 | 6 | | 1 | | |
| G2 | 881 | 49 | 1099 | 76 | 27 | | | |
| DATA | 930 | 200* | 1175 | 200* | — | — | | |
| ECC | 1130 | 7 | 1375 | 6 | | 1 | | |
| G3 | 1137 | 59 | 1381 | 79 | 20 | | | |
| | | 333 | | 385 | 54 | − 2 | = 52 | |

From Table II and FIGS. 1 and 2, it will be seen that a record Rn starts at a different location on the 3350 than on the 3330 and that the difference in byte locations is a function of the number of records that precede it plus the difference which existed at the beginning of R1. If the data fields for corresponding records R2 through Rn on the two tracks are assumed to be of equal lengths, then the difference between the bytes used on each track is a function of the number of records, since the difference for any one record is constant reflecting the basic difference in the two formats, i.e. non-data fields and gaps. The rightmost column of Tables I and II reflects the difference between the 3330 and 3350 track formats as a function of this cumulative difference.

As shown, record R2 takes 333 bytes on the 3330 and 385 bytes on the 3350 resulting again in a net difference of 52 byte positions.

It will be apparent from the above discussion that it is not possible to provide a permanent fixed virtual index on the 3350 representing the index signal at the end of the track on the 3330 since the virtual index will not occur a fixed number of bytes after index on the 3350, but is dependent upon the number of records which have been recorded on the track.

It was assumed earlier that the physical length of the tracks in both devices were the same. It should now be apparent that the physical length of the track is only relevant in that it affects byte capacity of the track. It was further assumed that both tracks (disks) were revolving at the same speed and it should now be apparent that the speed of the disk is really only relevant in that the speed affects the raw data rate which, in turn, does determine the number of bytes assigned to the various gaps in the CKD format. The various gaps are provided to allow the circuits in the drive to operate on data that has just been read and for these circuits to switch to various operating modes. The byte length of the gap is therefore assigned on the basis of time required for the circuits in the drive to operate. Another factor influencing gap size are the characteristics of the storage control unit and the system attaching the drive to the CPU. Because of this, it is possible for two drive types to have the same time for each gap even though the linear recording densities are different and/or the track speeds are different. It is likewise possible for two drive types to have the same number of bytes in the corresponding gaps of the count, key and data formats even though the data rates are different since one drive type may have system constraints and components whose response times offset and cancel the effects that the different data rates have on the number of bytes in the gap.

It should therefore be recognized that the problem arises in the situation where two storage devices having different byte capacities per track must operate on the same data processing system as though they are the same device and the position of the start of the record relative to the start of the track for the drive having the smaller byte capacity per track varies for any reason as a function of the cumulative bytes of nondata fields and that function is different from the corresponding function of the larger byte capacity track.

A solution to the above defined problem which does not require reprogramming of the data processing system is shown in FIG. 3A which illustrates a CKD format for the 3350 which provides a byte-used field of three bytes in length after the count field in the G2 gap. The byte-used field contains a 16-bit count representing the number of bytes between index (the start of the track) and the start of the record if all the preceding records had been recorded on the 3330 track. The third byte of this field is used for a check character on the preceding two bytes.

From Table I it was seen that record R1 starts at a different byte location on the 3350 than on the 3330 and that the difference in byte location was constant if the R0 data field on each track was the same. By providing a subfield in the G2 gap of record R1, a number may be recorded on the 3350 track that reflects the byte position on the 3330 track. This number is called the byte-used number in that it corresponds to the amount of track used measured in the number of bytes up to the start of record R1, if R1 had been recorded on a 3330 track. The number does not necessarily have to reflect the actual number of 3330 bytes used since the difference can be accomplished by adjusting the specified track capacity number downward to take care of any offset. This number may be generated in various ways since there is a known constant relationship among the various fields preceding R1 for both formats. Subsequent records R2-Rn are also provided with a byte-used subfield in the G2 gap to record byte used numbers reflecting the cumulative difference from index resulting from the previous records. Since the byte capacity of the 3330 track is specified, the virtual index can be readily signalled when the byte-used count which is being generated for recording in the byte-used subfield exceeds the adjusted specified capacity of the 3330 track. The real index signal which is normally generated by all files is used for a number of different purposes depending on the specific command being executed at the time index is detected. The virtual index signal serves the same purpose as the real index signal provided to the system by the 3330 or the 3350 when operating in the native mode.

Before proceeding with a detailed description of FIGS. 3A through 3D, the apparatus employed to format the track illustrated by FIG. 3A will be described in connection with FIGS. 4-6.

Figure 4:
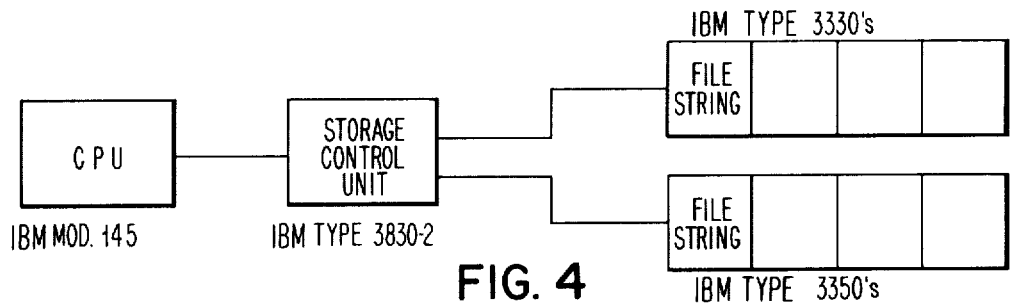
FIG. 4 illustrates in block diagram form a data processing system in which an IBM type 3330 file and an IBM type 3350 file are employed for storage.

Referring now to FIG. 4, there is shown a schematic arrangement of the data processing system employing two different type files for data storage. As shown, one device may be a 3330 Mod A1 and the other type storage device may be a 3350 Mod A1. Both devices are connected to an IBM type 3830 Mod 2 storage control unit which in turn is connected to an IBM Model 145 of the IBM type 370 System. The operation of an IBM type 370 System employing a Model 145 CPU, the type 3830 Mod 2 storage control unit and a type 3330 drive is well known in the art and details of each of the individual devices and their interrelationship can be found in the following IBM manuals.

| | |
|---|---|
| IBM System/370 "Principles of Operation" | GA22-7000 |
| IBM System/370 Mod 145 Functional Characteristics | FA24-3557 |
| Guide to IBM System/370 Mod 145 | GC20-1734 |
| 3830 Storage Control & 3330 Disk Storage | GA26-1592-4 |
| Reference Manual for IBM 3830 Storage Control Mod 2 | GA26-1617-3 |
| | GN26-0311 |

The formatting operation per se is not part of the present invention and, hence, no detailed description is provided. Reference may be had to the above mentioned manuals for this background information. The invention as embodied in FIG. 5 employs a number of signals for control purposes which exist for other purposes such as formatting in the drive or control unit. These are identified in the description of FIGS. 5 and 6.

Figure 5:
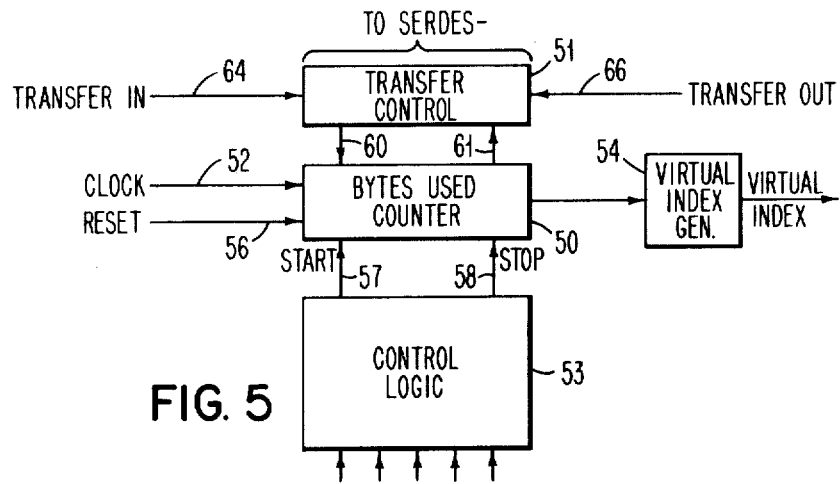
FIG. 5 illustrates the additional circuitry required in the IBM type 3350 to generate the byte-used number for each record in FIG. 3A and the virtual index signal.
Figure 6:
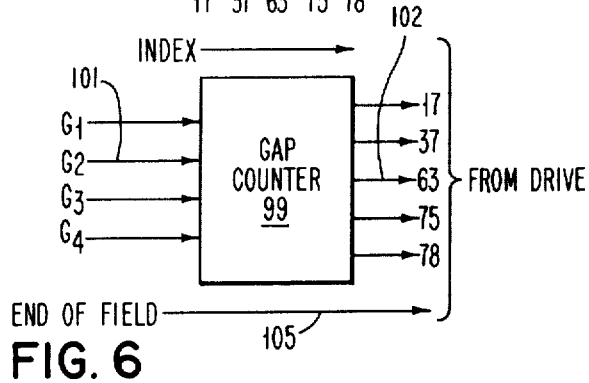
FIG. 6 is a functional illustration of circuits and signals present in disk files which may be used in connection with the present invention.

The embodiment of the invention as shown in FIG. 5 represents the additional circuitry which is provided to generate the byte-used number and virtual index signal for a disk drive. Functionally, the additional circuitry comprises a counter 50, means 51 for transferring a number to or from the counter at selected times, means 52 for stepping the counter at the byte rate of the associated drive, and control logic 53 for starting and stopping the counter at preselected times and/or counts so as to continuously reflect the appropriate number of bytes that would have been used in the other format during a recording operation. Additionally, means 54 are provided for generating a virtual index signal when the contents of the byte used counter 50 is equal to the track capacity of the other device (3330).

Counter 50 is shown in block diagram form in that it is a conventional binary counter which contains sufficient stages to represent the track capacity of the 3330 drive.

The counter is stepped by means of a byte clock signal generated in the 3350. The byte clock signal is one of the basic timing signals in any disk file and may be generated in any of the various ways known in the art such as by reading prerecorded byte clock signals from a servo disk and employing these signals to control a clock oscillator which provides the clock signal.

The counter is provided with a reset line 56 which functions when activated to reset the counter 50 to some predetermined setting such as zero.

The counter is also provided with start and stop control lines 57 and 58. When the start line 57 is activated, the counter is stepped by the byte clock signal 52. The counter is stopped when the stop line 58 is activated. Other start/stop control arrangements could, of course, be used.

Counter 50 is also provided with an input cable 60 and an output cable 61 which are activated under the control of the transfer control circuitry 51. The function of input cable 60 is to load the counter 50 with a byte-used number read from the byte-used subfield of a record on the track. The function of the output cable 61 is to read out the contents of the counter for recording in the subfield. The transfer may be in serial fashion, or parallel by byte. In this instance, transfer is assumed to be a one-byte wide transfer so cables 60 and 61 have appropriate connections to selected stages of the counter. As previously mentioned, the byte-used number in the subfield, as shown in FIG. 3A, includes a one-byte check character which is merely stored in the counter. The check character may be generated by the overall ECC circuits of the file as the number is read from the subfield and appended to the two-byte number as the counter 50 is being loaded. Likewise, the check character is merely read out of the counter 50 following transfer of the first two bytes.

The virtual index generator is shown functionally as block 54 in that various circuit arrangements known in the art for generating a signal when a number equals or exceeds a predetermined value may be employed for block 54.

The transfer control 51 is also shown as a functional block in that there are various ways known in the art for controlling the loading and unloading of a counter. Data to be recorded on a disk is generally placed in a serializer-deserializer register (Serdes) from the system. The data is then encoded such that signals are provided to a write trigger which supplies current through the magnetic transducer. In a reading operation, flux changes are sensed by the head and decoded into binary digits and placed serially into Serdes. When one byte of data is assembled, that byte is then transferred out to its destination. The Transfer-In signal 64 occurs in response to the first byte of the byte-used number being assembled in Serdes and is keyed to the last byte of ECC having been read. Likewise, the Transfer-Out signal 16 occurs at a time to place the first byte of the contents of the counter in Serdes to allow that byte to be recorded in the first byte position of the byte used subfield. Subsequent bytes are sequentially transferred out in a similar manner.

The control logic shown diagrammatically as a block 53 can be implemented in a number of ways depending on the differences in the format characteristics of the two files involved, the formatting signals that are generally available in the drive, and the degree of control sophistication desired.

Since the variable length data field is the same length in terms of the number of bytes in both formats and since format signals are generally available in the file to signal the start and end of a data field, the most straightforward approach is to step the counter during the period the variable length data field is being recorded.

In addition, since each record R1 through Rn recorded on the 3350 has a fixed difference in overhead bytes relative to the corresponding records on the 3330, this difference can be reflected by turning off the byte-used counter for that number of bytes. The manner in which this is accomplished for each record may take into consideration that a point exists in inter-record gaps G3, known as the channel overrun point, prior to which no counting should take place, since prior to this point the next operation is not known. Similarly, the fact that data is entered into the counter and transferred out of the counter should be considered since stopping the counter during this period of time can result in a simpler implementation.

Lastly, the byte-used number for R1, as previously mentioned, does not necessarily have to reflect the actual number of bytes that would have existed on the 3330 since the difference can be taken care of by adjusting the specified track capacity number in the virtual index generator.

The operation of the arrangement shown in FIG. 5 will now be explained in connection with FIGS. 3A through 3D and FIG. 6 which is a diagrammatic showing of signals generated by a conventional gap counter 99 which is part of the normal formatting apparatus (not shown) of the drive. In FIG. 6 a count signal of 17 of gap counter 99 indicates that 18 byte positions have elapsed from the start of the gap. Similarly, if the byte-used counter was being stepped from prior to the time the gap counter started counting and is stopped in response to a count 17 signal, the byte-used counter 50 would have been stepped 18 counts plus the number of counts that occurred prior to the start of the gap.

Likewise, if the byte-used counter is started in response to a count 63 signal from the gap counter 99, it counts that byte, which is the 64th byte of the gap, and all subsequent bytes of the gap until it is turned of. A G2 gap which is 76 bytes in length is terminated at the end of count 75 or when the gap counter reaches count 76 since the counter is advanced from a 0 count to a 1 count after the first byte. This is reflected in the specific counts designated in FIGS. 3A through 3D and FIG. 6.

Two separate operations are described below. First, the situation where orientation is established at index and second, where orientation is established on record Rn.

With reference to FIGS. 3A through 3D, the byte-used number stored in the byte-used subfield of record R1 is 171, as shown on the first line of FIG. 3D. As mentioned previously, the number 171 is not necessarily exact in the sense that 171 bytes would have been used on the 3330 track. Any difference between the number selected for the R1 byte-used subfield and the actual number of 3330 bytes can be accounted for by adjusting the specified track capacity of the 3330 either up or down. As shown on the second line of FIG. 3D, the number 171 is obtained by turning the counter on for three different periods of time C1, C2 and C3, which together total 171.

The first period, C1, shown on line 2 of FIG. 3D, comprises 74 bytes and is obtained by turning the counter on at byte count 63 time of the first G2 gap after index. This start signal may be generated by ANDing a G2 gap signal 101, FIG. 6, with a count 63 signal 102. The stop signal for ending the first period C1 is generated by a count 37 signal from gap counter 99. The 74 bytes of C1, as shown on line 3 of FIG. 3D, result from counting the remaining 12 bytes of G2 shown on line 4 of FIG. 3D, the 24 bytes (18+6) of the count and ECC fields and the first 38 bytes of the second G2 gap, shown on line 5 of FIG. 3D.

The second period, C2, shown on line 2 of FIG. 3D, comprises 64 bytes, shown on line 3 of FIG. 3D, and is obtained by again turning the byte-used counter 50 on at count 63 of the second G2 gap and stopping it at count 37 of the G3 gap. The counter is stepped 64 bytes consisting of 12 bytes remaining in the G2 gap, 14 bytes (8+6) of R0 data and ECC fields and the first 38 bytes of the G3 gap, as shown in lines 4 and 5 of FIG. 3D.

The last period, C3, shown on line 2 of FIG. 3D, comprises 33 bytes, shown on line 3 of FIG. 3D, and is obtained by turning on the counter 50 at count 63 time of the G3 gap and turning off the counter at the end of the R1 count field by means of the end-of-count field signal 105 from the formatting means. The 33 bytes result from counting the remaining 15 bytes of the G3 gap and the 18 bytes of the count field of record R1, as shown on line 1 of FIG. 3D. The contents of the byte-used count at this point is 171.

The counter is stopped at the end of the R1 count field for 24 bytes to allow transfer of the count 171 from counter 50 to the recording circuits of the drive. The count 171 is stored in the first two bytes of the subfield along with a 1-byte check character which has been generated during this transfer.

The byte counter 50 is next started in response to the G2 count 17 signal of the gap counter and remains on until count 37 of the G3 gap. During this period, designated C4 on line 3 of FIG. 3D, the byte used counter is stepped by 58 byte counts remaining in the G2 gap, by 100 bytes during the data field, by 6 bytes of the ECC field and by the first 38 bytes of the G3 gap, as shown on line 4 of FIG. 3D.

The byte-used counter 50 is off during the 26 byte period of the G3 gap from count 37 to count 63. Byte counter 50 is started again at count 63 and is turned off by the end-of-field signal which occurs at the end of the R2 count field. This period is designated C5 in line 2 of FIG. 3D. At this point the contents of byte-used counter is 406, as shown on line 1 of FIG. 3D, which represents the byte-used number to be stored in the byte-used subfield of R2. The operation continues from this point on for subsequent records in the same manner. On a conceptual basis, the net difference in overhead bytes between the 3330 format and the 3350 format for Records R1 through RN is reflected by stopping the byte used counter for a corresponding number of bytes. The number of bytes that the counter is off is made up of two off periods, D1 and D2, as shown on line 2 of FIG. 3D. Since the counter is stopped to transfer data in or out, one period, D1, consists of 24 bytes, as shown on line 3 of FIG. 3D, made up of 6 ECC bytes of the count field and 18 bytes of the G2 gap, as shown on line 4 of FIG. 3D. Since the byte-used counter is turned on by count 17, the counter has been stopped the 18 byte positions 0–17. The second off period, D2, shown on line 2 of FIG. 3D, occurs between count 37 and count 63 of the G3 gap and consists of 26 bytes, as shown on lines 3 and 4 of FIG. 3D. The total of 50 bytes that the counter is turned off represents the net overhead bytes for these two specific formats and can be analyzed as follows:

|  | 3330 | 3350 |  |
|---|---|---|---|
| G3 | 59 | 79 | +20 |
| CNT | 11 | 18 | +7 |
| ECC (CNT) | 7 | 6 | −1 |
| G2 | 49 | 76 | +27 |
| DATA | — | — | — |
| ECC (DATA) | 7 | 6 | −1 |
|  |  |  | −52 |
| 3330 Tolerance |  |  | −2 |
|  |  |  | +50 |

The actual net difference for any record in the two formats is 52 bytes. However, a two-byte tolerance factor has been allowed per record in this embodiment of the invention to account for timing tolerances (as reflected in the 3330 track capacity formula) which exist among the population of 3330 drives on which this sequence of records may have to be stored. The net effect of the negative two-byte tolerances on the byte-used count stored in each subfield is to increase the byte-used number by 2 bytes for each record stored which results in the virtual index signal being generated early enough so that the sequence of records stored on the 3350 track will fit on any 3330 track and not cause an overrun condition.

As the operation proceeds for subsequent records, the virtual index generator 54 in FIG. 5 continually monitors the contents of the byte-used counter until it reads some predetermined count reflecting the specified track capacity of the 3330 adjusted to reflect any differences prior to R1, as mentioned earlier. In this instance the predetermined count is 13,300 bytes so that when the contents of the byte-used counter obtains this count, a virtual index signal is generated in box 54 of FIG. 5.

The arrangement shown in FIG. 5 also operates where record orientation is established after index. In this situation, the byte-used number is read from the record and transferred to the byte-used counter immediately after normal transfer of the count field and ECC bytes. The counter is then started in the G2 gap by the count 17 signal of the gap counter and the operation proceeds in the manner previously described.

It will be obvious to those skilled in the art that differences between the two formats which have not been discussed but which can affect the format overhead can be handled by modifying the starting and stopping of the counter. For example, the provision in the format for skipping defects which is discussed in copending application Ser. No. 596,321, now U.S. Pat. No. 3,997,876, assigned to the Assignee of the present invention merely requires the recognition that a G4 type gap is being operated on, which adds a fixed number of bytes to the length of the record on the 3350. Since this is overhead, the counter may be stopped either during the actual G4 gap or for an equivalent number of bytes at some other convenient time.

While the invention has been particularly shown and described with reference to preferred embodiments thereof, it will be understood by those skilled in the art that various changes in form and details, including but not limited to those suggested, may be made therein without departing from the spirit, scope and teaching of the invention. Accordingly, the apparatus and methods herein disclosed are to be considered merely as illustrative and the invention is to be limited only as specified in the claims.

What is claimed is:

1. A method for generating a virtual index signal for a first disk file in which the byte capacity per track is greater than the specified byte capacity per track of a second disk file which would generate the real index signal and in which the recording format of said first disk file is different than the recording format of said second disk file whereby the first disk file may replace the second disk file in a data processing system without changing the portion of the program of the data processing system that is dependent on the byte capacity per track of the attached disk file, said method comprising:

stepping a counter in said first disk file at the data rate of said first disk file as records are recorded as bytes of information on a track of said first disk file;

interrupting the stepping of said counter for a predetermined number of counts during the recording of each record;

monitoring the contents of said counter; and generating said virtual index signal when said monitoring step indicates that the contents of said counter corresponds to the said specified byte capacity per track of said second disk file.

2. The method recited in claim 1 in which said stepping step includes the generation of a byte clock signal having a frequency corresponding to the data rate of said first disk file for stepping said counter.

3. The method recited in claim 2 in which said predetermined number of counts is preestablished in accordance with the net difference in bytes between the formats of said first disk file and said second disk file.

4. The method recited in claim 3 further including the step of recording in each record the contents of said counter at a preselected time.

5. The method recited in claim 4 in which said recording step includes the recording of the contents at a byte location in each said record which does not affect said net difference.

6. The method recited in claim 5 further including the step of transferring from a first said record the previously recorded contents of the counter to the counter prior to initiating the stepping of the counter.

7. In a method for transferring data from a processing unit to first and second storage devices attached thereto wherein the second storage device has a specified byte capacity per track which is greater than the specified byte capacity per track of the first device, and wherein the first device signals the processing unit that a predetermined end point in said track has been reached, the improvement of generating a virtual end-of-track signal in said second device when data is recorded as a sequence of records on said second device in a format different than the recording format employed by said first device to record said data, said virtual signal being generated at a point in said sequence of records which corresponds to when said first device would signal said processing unit that said end point has been reached if said sequence of records had been recorded on said first device, the improvement comprising the steps of:

stepping a counter a selected number of steps as each record of said sequence is written on the second device, said number being the number of bytes that would have occurred between the start of said each record and the start of said track had the sequence of records been recorded on the first device; and monitoring the contents of said counter to generate said virtual signal when said contents exceeds the specified byte capacity per track of said first device.

8. The method of claim 7 including the step of formatting the data in count-key-and-data formats which have a difference in bytes that is constant.

9. The method of claim 7 in which the improvement includes the further steps of recording the contents of the counter at a predetermined time at a predetermined point in each record and transferring a previously recorded count from the first of each said record to said counter at another predetermined time.

10. In a storage system having first and second storage devices wherein the specified byte capacity of each track of said second device exceeds the specified byte capacity of each track of said first device and includes means for formatting information stored on said first device in a first recording format in the form of individually addressable multibyte records and information stored on said second device in a second recording format in the form of individually addressable multibyte records, said first and second recording formats being different, the improvement comprising:

a counter in said second device;

means connected to said counter for selectively stepping the counter at a rate corresponding to the data rate of the second device such that the contents thereof at the time each of said records is recorded reflects the number of bytes that would be present between the start of the track and the start of said each said record if the record had been recorded on said first device in said first format; and means connected to said counter for generating a virtual index signal when the contents of the counter corresponds to said specified track capacity of said first device.

11. In a storage system comprising a first and second multitrack magnetic storage device in which the specified byte capacity of each track of the second device exceeds that of the first device, means for formatting information stored on the first device in a first recording format comprising a plurality of individually addressable multibyte records, and for formatting information stored on the second device in a second recording format comprising a plurality of individually addressable multibyte records, the first and second recording formats being different in that non-data portions of the corresponding records have a different number of byte positions, the improvement comprising:

a counter in the second device;

means for stepping said counter at a rate corresponding to the data rate of the second device;

circuits for controlling the operation of said counter such that the contents thereof at the time each said record is to be recorded reflects the number of bytes that would be present between the start of the track and the start of said each said record if the record had been recorded on said first device in said first format;

means for transferring said contents of said counter to the recording media of said second device to be recorded with said each said record; and means for generating a virtual index signal at a time when said contents of said counter corresponds to said specified track capacity of said first device.

12. In a disk file adapted to store, in a count-key-and-data format on each track, sequences of records received from a data processing system, the improvement comprising:

a system for generating a virtual end-of-track signal which would correspond to the real end-of-track signal when each said sequence is recorded on another disk file having a byte capacity per track which is less than the byte capacity per track of said first said disk file and a count-key-and-data format which is different from said count-key-and-data format of said first said disk file, said system including in combination:

a counter operable to step at the byte rate of said first said disk file;

means connected to said counter for controlling during the period said sequence is being formatted, the starting and stopping of said counter in accordance with a predefined relationship between said formats of said files; and means connected to the output of said counter to generate said virtual end-of-track signal in response to the contents of said counter exceeding a predetermined count.

13. The combination recited in claim 12 further including means connected to the output of said counter for transferring the contents of said counter to said first said disk file so that a "bytes used" number can be recorded with each record being recorded, which number represents the number of bytes that would have occurred between the start of the track and the start of the record if said sequence had been recorded on said other disk file.

14. The combination recited in claim 13 further including means connected to the input of said counter for transferring a previously recorded "bytes used" number from said record to said counter.

15. The combination recited in claim 14 in which said means for transferring numbers to and from said counter includes control inputs adapted to be connected to existing control signal lines of said first said disk file.

16. The combination recited in claim 15 in which said means for generating a virtual end-of-track signal includes means for storing a number corresponding to the byte capacity per track of said other disk file.

17. A system for generating a virtual end-of-track signal for a first disk file in which the specified byte capacity per track is greater than the specified byte capacity per track of a second disk file, both said files being adapted to store data in individually addressable records, with each record having a variable byte length data field and at least one fixed byte length non-data field, the non-data field recorded by said first file having a different number of bytes than the non-data field recorded by said second file whereby the byte time position at which the virtual end-of-track signal is generated varies as a function of the number of records recorded on a track of said first disk file and the difference in the number of bytes in said non-data fields, said system comprising:
- a counter adapted to be stepped at a rate corresponding to the data rate of said first device;
- control logic connected to said counter to control the starting and stopping of said counter to cause the contents thereof to reflect the number of bytes that would have been recorded on a track of said second file if the data had been recorded thereon; and
- means connected to said counter to generate said virtual end-of-track signal when the contents of said counter exceeds a predetermined count.

18. The combination recited in claim 17 further including count transfer means connected to said counter and adapted to be connected to the reading and recording circuits of said first disk file to transfer count information between said counter and said first disk file.

19. The combination recited in claim 18 in which said control logic causes said counter to be stepped once for each byte of data in a data field of each record and not stepped during non-data fields for a predetermined number of bytes of each record, said predetermined number corresponding to the difference in bytes of their respective non-data fields.

20. The system recited in claim 17 in which said first disk file includes means for formatting said data and in which said control logic is adapted to be connected to said means for formatting said data in said first file whereby selected signals of said means for formatting may also be employed as counter control signals.

21. A method for generating a virtual end-of-track signal for a first disk file in which the byte capacity per track is different than the byte capacity per track of another disk file and which has means for formatting data differently than is formatted for said other disk file whereby the first disk file may replace the second disk file in a data processing system without changing the portion of the program of said data processing system that is dependent on the byte capacity per track of said other storage device, said method comprising:
- stepping a counter in said first disk file at the data rate of said first file as records are recorded on a track of said first disk file;
- interrupting the stepping of said counter for a predetermined number of counts during the recording of each record;
- monitoring the contents of said counter; and
- generating said virtual end-of-track signal when said monitoring step indicates that the contents of said counter exceeds the said byte capacity per track of said other disk file.

22. In a storage system having first and second magnetic disk files wherein the specified track capacity of the files are different and where one file includes means for formatting information being stored in a first recording format having individually addressable records, and where the other disk file includes means for formatting information in a second recording format having individually addressable records, said first and second recording formats being different, the improvement comprising:
- a counter in one of said files;
- means for selectively stepping said counter at a rate corresponding to the data rate of the last said one file such that the contents thereof at the time each record is to be recorded on said last one said file reflects the number of bytes that would be present between the start of the track and the start of the record if the record had been recorded on said other file in its format; and
- means for generating a virtual index signal when the contents of said counter corresponds to the specified track capacity of said other file.

* * * * *